May 19, 1931. A. P. MILLER 1,805,993
METHOD OF AND APPARATUS FOR WATER FILTRATION
Filed Nov. 27, 1928
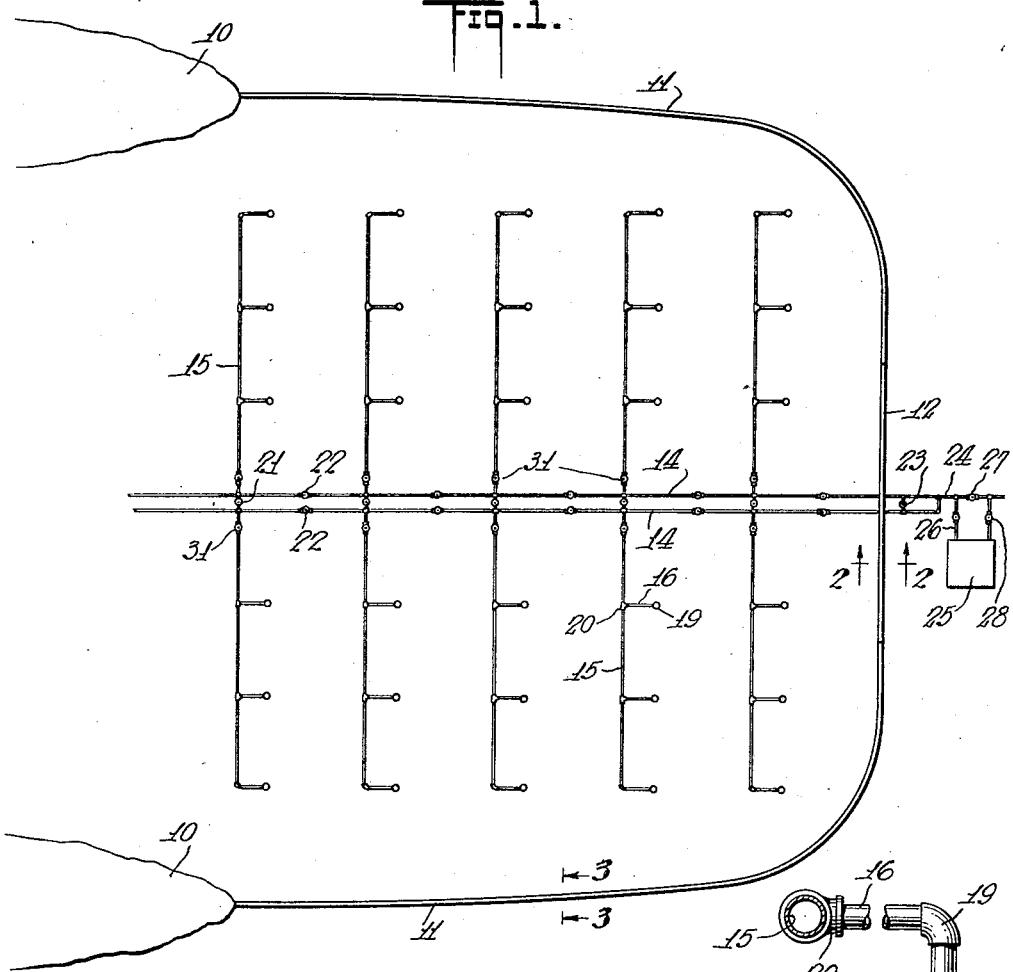
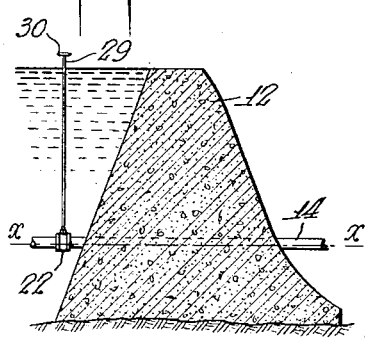
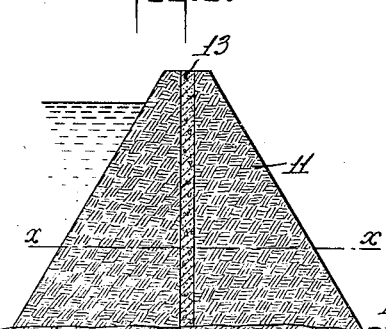
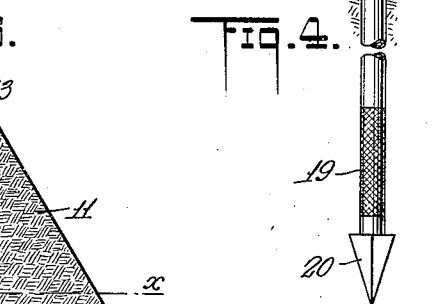
INVENTOR
Anthony P. Miller
BY Franklin J. Foster
ATTORNEY Patented May 19, 1931

1,805,993

UNITED STATES PATENT OFFICE

ANTHONY P. MILLER, OF PLEASANTVILLE, NEW JERSEY

METHOD OF AND APPARATUS FOR WATER FILTRATION

Application filed November 27, 1928. Serial No. 322,140.

The present invention in its broader aspect is capable of embodiment in filtration methods and filtration apparatus for many purposes, but finds its preferred field of usefulness in connection with the filtration of relatively large and continuous water supplies, such, for instance, as the filtration of a municipal water system flowing into city supply mains from a natural or artificial reservoir.

One of the primary objects of the invention is to provide a filtration system or purifying system which in some instances may eliminate the need for chemically treating the water, which will positively guard against the introduction of either animal or vegetable matter into the mains which lead from the reservoir, and which prevents discoloration of the water after heavy rainfalls. The latter is a common convenience where water is pumped directly from open reservoirs, and while the discoloration is not necessarily injurious, it renders the water impalatable and unappetizing.

Another object of the invention is to provide a filtration system which not only positively prevents contamination of the water, but which obviates the necessity for utilizing supplemental open reservoirs or storage containers for the filtered water (into which impurities may find their way) and permits the filtered water to flow or be pumped from the reservoir through the filter directly into the mains.

Another object is to provide a filtration apparatus which is of a simple and inexpensive nature and which may be conveniently installed in old reservoirs or built into new ones.

An important feature is the fact that this normally submerged filtration apparatus may be repaired by divers or may be otherwise rendered readily accessible for purposes of repair, replacement or enlargement without cessation of water flow into the mains and consequently without disturbance of the continuous supply of water to a municipality while the repairs are being effected.

In a preferred embodiment of the invention, I utilize for filtering purposes the natural bed of sand in the bottom of the reservoir. Well points of a conventional nature are sunk into this sand bed, and at a point above the sand, but well below the high water level in the reservoir, are connected to feeders for the supply mains. Preferably these feeders, mains and well point connections are slightly above the natural water level within the reservoir area, so that when the dam gates are open the water level will recede to a point where all of the valves and connections are exposed.

In operation, having installed the filtering apparatus, the dam gates are closed and a head of water builds up within the reservoir. The pressure of this head working down through the bed of sand creates a pressure on the subterranean supply of water and forces the water in the sand through the screened inlets near the bottoms of the well points and thence through the feeders to the mains. The entire action is by gravity, no suction pumps or other apparatus being required to induce the natural flow of water down through the sand, up through the well points and thence to the mains.

One advantage of this system is the fact that the well points may be installed over a tremendous area in a large reservoir so that there is practically no danger of the sand in which they are imbedded losing its filtering qualities. Small animal or vegetable matter entering the reservoir from the creeks and streams from which it is supplied are of course unable to find their way down through the sand to the deeply imbedded inlets of the well-points, with the result that a pure and continuous flow of water is assured.

Preferably a number of mains and well point sets are used so that during the abnormal low water condition which obtains while repairs are being made water may be pumped from the unaffected mains.

With the above noted and other objects in view, the invention consists in certain novel features of construction and combinations and arrangements of parts which will be more fully hereinafter described and pointed out in the claims.

The invention may be more fully understood from the following description in connection with the accompanying drawings, wherein:

Fig. 1 is a diagrammatic plan view of a reservoir equipped with my improved filtration apparatus.

Fig. 2 is an enlarged typical transverse sectional view through the dam taken on the line 2—2 of Fig. 1.

Fig. 3 is a similar view on the line 3—3 of Fig. 1 through one of the artificial embankments of the reservoir.

Fig. 4 is a broken view partly in vertical section and partly in side elevation taken approximately on the line 4—4 of Fig. 1.

In the drawings, I have used the reference numerals 10—10 to designate a pair of hills or natural embankments which are supplemented by artificial embankments 11 and the dam 12, to provide a reservoir. The dam may be of any conventional character, a typical cross-section being shown in Fig. 2, and the dam being provided with the usual gates (not shown). A typical cross-section of the artificial embankments 11 is shown in Fig. 3, wherein it may be noted that the earthwork of these embankments is supplemented by a central concrete partition wall 13.

From the standpoint of the present invention the particular construction of the embankments and dam is of no importance and these views are herein illustrated simply as being typical of common artificial reservoirs or semi-artificial reservoirs which serve to store the relatively large water supplies commonly demanded by municipalities.

The natural water level within the dam is indicated by the lines $x$—$x$ of Figs. 2 and 3, and it will be noted that this level is slightly below the level of the mains 14 which are installed in the reservoir slightly above the bottom thereof and which extend outwardly through the dam 12.

Lateral feeders 15 enter the mains 14 and the feeders receive water through branch pipes 16 from conventional well points 17 sunk deeply into the sand bed 18 of the reservoir and having screened inlet openings 19 near their lower deeply imbedded ends. Whether the well points are provided with the usual pointed entering ends 20 is of little importance, since these points may be conveniently jetted or otherwise sunk into the filtering bed of sand.

The manner of attaching these well points to the lateral feeders 15 is subject to considerable variation, but for illustrative purposes I have shown the upper ends of the well points connected by elbows 17 to the feed pipes 16 which in turn are connected by T couplings 20 to the laterals 15.

It is within the scope of the invention to employ a single main and a single set of laterals and well points. For emergency purposes, however, as will more fully hereinafter appear, I prefer to provide at least two mains 14 and to connect the laterals 15 to both of these mains, those portions of the laterals between the mains being provided with valves 21. Each main between its point of connection to two adjacent laterals is provided with valves 22. Exteriorly of the reservoir a short valved pipe 23 connects the mains and both mains 14 deliver into a common supply line 24.

An emergency pumping station designated diagrammatically at 25 may draw water through a valved pipe 26 from one side of a valve 27 in the line 24 and to deliver it through a valved pipe 28 back to the line 24 on the opposite side of the valve 27. The control valves 22 in the mains 14 are preferably equipped with elongated valve stems 29 which project above the high water level in the reservoir and are provided with operating handles 30. Control valves 31 also permit any lateral to be cut off from the mains.

Whether the bed 18 is a natural sand bed or an artificial one makes little difference, but the average large reservoir is provided with a sand bottom or a substratum of sand beneath its bed which may conveniently serve as the filtering medium in which the inlet ends of the well points are imbedded.

At the time of the original installation of the filtering apparatus the dam gates are opened and the water level drops to its natural level at $x$—$x$. The mains, laterals and well-points are then installed. Under ordinary conditions all valves 21, 22, 23 and 27 are opened while the valves in the pipes 26 and 28 to and from the pumping station are closed. When the dam gates are closed the water level will build up, as best seen in Figs. 2 and 3 to a point which is considerably above the level of the mains 14. In consequence this head of water will transmit pressure directly to the water in the substratum or filtering bed of sand and water will pass through this bed, through the well point screens 17 and out through the laterals and mains from which it flows by gravity to remote pumping stations (not shown) whence it is pumped under pressure to its points of consumption. This flow of water out of the reservoir is entirely natural, however, the water which passes up through the well points merely seeking its own level.

In the event that repairs are required the valving permits any desired set of laterals to be cut off or permits either of the mains to be cut off. Repairs may be made by a diver or the water level may be lowered to a point where the connections for the filtering apparatus are exposed. It is only in this contingency or during periods of unusual drought that the pumping station 25 need be used, since if the water level drops below the mains there will be no outflow and the flow must be induced by a vacuum pumping system.

Contrary to conventional practice the present arrangement not only insures a thorough filtering of the water but maintains at all times a reserve ground water supply which is readily accessible in times of extreme drought and which may be caused to flow through regular mains by setting the pump in operation.

I have referred above to the fact that the present system obviates the necessity for storing filtered water in open secondary reservoirs where it is apt to become contaminated after filtration. By my present system the main which leads from the reservoir to the remote pumping stations may conveniently be of very large size and may itself serve as a closed reservoir for the filtered water.

The term reservoir as used in the claims is used for the most part in its broadest sense and is intended to cover not only the artificial or semi-artificial reservoirs of the character shown in the drawing, but to cover the natural water supply of an entire water-shed.

For instance, in many localities numerous small brooks and creeks flow into the main reservoir over the entire area of the watershed which supplies the reservoir. According to my method and apparatus the supply pipes may be led through long distances and the well points sunk even in the beds of the brooks and streams or sunk into the ground where subterranean water supplies are available. The advantage of this is that the supply can be in emergencies, actually tapped at its source even though the streams which feed the main reservoir have nearly dried up in exceptionally dry weather.

It will be noted from the drawings that the combined cross sectional areas of the various well points far exceed the cross sectional area of the main or mains. In other words, the joints are arranged to give a great over supply of water to the mains. By virtue of this arrangement, regardless of whether the system is operated by gravity or by a siphoning action or by a vacuum pump drawing water from the mains, there will be a marked difference between the rate of flow of water into the well points and the rate of flow through the mains, that is to say, it will require a comparatively slow flow of water through the sand and into the well points to afford a comparatively rapid flow through the mains. The advantage of this is that no small particles of foreign matter will find their way into the well points as might be the case if the points needed to operate at maximum capacity in order to supply the main.

What I claim is:

1. A gravity filtration apparatus including in combination with a reservoir and a stratum of sand at or below the bed thereof, a submerged main for filtered water disposed above the sand stratum and leading therefrom, feeders for said main, and well points connected to the feeders and having their screened inlet ends embedded in the sand, said feeders and well points being also submerged to effect a gravity feed to the main.

2. The combination with a reservoir and a stratum of sand or equivalent filtering material thereunder of a submerged main for filtered water disposed above the sand stratum and leading from the reservoir, submerged well points operatively connected to the main for supplying the latter and having their inlet ends sunk in the filtering bed of the reservoir.

3. The combination with a reservoir and a stratum of sand or equivalent filtering material thereunder of a main for filtered water leading from the reservoir, well points operatively connected to the main for supplying the latter and having their inlet ends sunk in the filtering bed of the reservoir, the main and all flow paths thereto being disposed below the artificially produced water level in the reservoir and the main being disposed above the sand stratum whereby a gravity flow of water is induced up through the well points and into the main.

4. The combination with a reservoir and a stratum of sand or equivalent filtering material thereunder of a normally submerged main for filtered water disposed above the stratum of filtering material leading from the reservoir, well points operatively connected to the main for supplying the latter and having their inlet ends sunk in the filtering bed of the reservoir, the main and its connections to the well point being disposed above the natural water level in the reservoir area whereby the main and its connections may be exposed for repair purposes when the water in the reservoir is permitted to fall to its natural level.

5. A gravity water filtration and supply system for municipalities or the like including a reservoir having a sand bed, well points sunk deeply into the bed and having screened inlet openings near their bottoms, a main above the bed of the reservoir and feeder pipes connecting upper ends of the well points and the main, the main being disposed below the artificially produced water level of the reservoir, whereby a natural gravity flow of water occurs down through the filtering sand, up through the well points and out through the main.

6. A water filtration and supply system for municipalities or the like including a reservoir having a sand bed, well points sunk deeply into the bed and having screened inlet openings near their bottoms, a main above the bed of the reservoir and feeder pipes connecting upper ends of the well points and the main, the main being disposed below the artificially produced water level of the reservoir, whereby a natural gravity flow of water occurs down through the filtering sand, up through the well points and out through the main, the main, feeders and well point connections being above the natural water level in the reservoir area whereby they may be exposed for repair purposes when the water level is lowered.

7. Apparatus as set forth in claim 5 wherein two sets of mains, feeders and well-points are provided and all of the feeders are arranged to selectively deliver into either main, and pump mechanism associated with the mains is operative to pump water from either main while the other is being repaired.

8. A water filtration and supply system for municipalities or the like, including a reservoir having a sand bed, wells sunk into the bed and having screened inlet openings near their bottoms, a main supplied from the wells, the combined cross sectional area of the wells greatly exceeding the cross sectional area of the main, whereby a relatively slow flow of water through the sand into the wells may effect a relatively rapid full capacity flow through the main.

Signed at Atlantic City, in the county of Atlantic and State of New Jersey this 24th day of November, A. D. 1928.

ANTHONY P. MILLER.